United States Patent
Aronovich

(10) Patent No.: US 10,977,091 B2
(45) Date of Patent: *Apr. 13, 2021

(54) WORKLOAD MANAGEMENT WITH DATA ACCESS AWARENESS USING AN ORDERED LIST OF HOSTS IN A COMPUTING CLUSTER

(71) Applicant: INTERNATIONAL BUSINESS MACHINES CORPORATION, Armonk, NY (US)

(72) Inventor: Lior Aronovich, Thornhill (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/743,787

(22) Filed: Jan. 15, 2020

(65) Prior Publication Data

US 2020/0151026 A1     May 14, 2020

Related U.S. Application Data

(63) Continuation of application No. 15/945,908, filed on Apr. 5, 2018, now Pat. No. 10,585,714.

(51) Int. Cl.
*G06F 9/46*    (2006.01)
*G06F 9/50*    (2006.01)
*G06F 13/22*   (2006.01)
*G06F 9/48*    (2006.01)

(52) U.S. Cl.
CPC .......... *G06F 9/5083* (2013.01); *G06F 9/4881* (2013.01); *G06F 9/505* (2013.01); *G06F 13/22* (2013.01)

(58) Field of Classification Search
None
See application file for complete search history.

(56) References Cited

U.S. PATENT DOCUMENTS

| | | |
|---|---|---|
| 6,769,017 B1 | 7/2004 | Bhat et al. |
| 7,730,178 B2 | 6/2010 | Labio et al. |
| 8,375,392 B2 | 2/2013 | Becchi et al. |
| 8,392,575 B1 | 3/2013 | Marr |
| 9,292,350 B1 | 3/2016 | Pendharkar et al. |

(Continued)

FOREIGN PATENT DOCUMENTS

| | | |
|---|---|---|
| CN | 102137128 A | 7/2011 |
| CN | 104317658 A | 1/2015 |

(Continued)

OTHER PUBLICATIONS

List of IBM Patents or Patent Applications Treated as Related (2 Pages).

(Continued)

*Primary Examiner* — Gregory A Kessler
(74) *Attorney, Agent, or Firm* — Griffiths & Seaton PLLC

(57) ABSTRACT

Embodiments for workload management with data access awareness by ordering hosts for scheduling workloads in a computing cluster. In response to receiving an input workload for scheduling by a workload manager, a set of inputs is retrieved from a storage system by a data requirements evaluator module. The data requirements evaluator module generates a list of cluster hosts ranked for performing the input workload according to data access considerations.

21 Claims, 9 Drawing Sheets

(56) References Cited

U.S. PATENT DOCUMENTS

| | | |
|---|---|---|
| 9,426,026 B2 | 8/2016 | Rider |
| 9,483,378 B2 | 11/2016 | Kopp et al. |
| 9,513,967 B2 | 12/2016 | Dube et al. |
| 9,582,221 B2 | 2/2017 | Du et al. |
| 10,310,748 B2 | 6/2019 | Deshmukh et al. |
| 2012/0185867 A1 | 7/2012 | Archer et al. |
| 2013/0290957 A1 | 10/2013 | Li et al. |
| 2015/0161529 A1 | 6/2015 | Kondaji et al. |
| 2015/0248361 A1 | 9/2015 | Van Riel |
| 2015/0301861 A1 | 10/2015 | Lachiusa et al. |
| 2016/0094480 A1 | 3/2016 | Kulkarni et al. |
| 2016/0162320 A1 | 6/2016 | Singh et al. |
| 2017/0031819 A1 | 2/2017 | Venkatasubramanian et al. |
| 2017/0060455 A1 | 3/2017 | Deshmukh et al. |
| 2017/0060769 A1 | 3/2017 | Wires et al. |
| 2017/0109205 A1 | 4/2017 | Ahuja et al. |
| 2017/0235609 A1 | 8/2017 | Wires et al. |
| 2017/0235613 A1 | 8/2017 | Smola et al. |

FOREIGN PATENT DOCUMENTS

| | | |
|---|---|---|
| CN | 104657221 A | 5/2015 |
| CN | 106502792 A | 3/2017 |
| EP | 2752779 B1 | 6/2016 |
| WO | 2005089240 A2 | 9/2005 |

OTHER PUBLICATIONS

Kozuch et al. "Tashi: Location-aware Cluster Management," ACDC '09, ACM, Jun. 19, 2009 ( 6 Pages).

Ganapathi et al., "Statistics-Driven Workload Modeling for the Cloud," IEEE 26th Internation Conference on Data Engineering Workshops (ICDEW), Mar. 1-6, 2010 (6 Pages).

Pai et al., "Locality-Aware Request Distribution in Cluster Based Network Servers," Proceedings of the Eighth International Conference on Architectural Support for Programming Languages and Operating Systems (ASPLOSVIII), Oct. 1998 (12 Pages).

WORKLOAD MANAGEMENT WITH DATA ACCESS AWARENESS USING AN ORDERED LIST OF HOSTS IN A COMPUTING CLUSTER

CROSS REFERENCE TO RELATED APPLICATIONS

This Application is a Continuation of U.S. patent application Ser. No. 15/945,908, filed on Apr. 5, 2018.

BACKGROUND OF THE INVENTION

Field of the Invention

The present invention relates in general to computing systems, and more particularly to, various embodiments for workload management and scheduling within and/or between distributed computing components.

Description of the Related Art

In today's society, computer systems are commonplace. Computer systems may be found in the workplace, at home, or at school. As computer systems become increasingly relied upon, convenient, and portable, the Internet has grown exponentially. Now, more than ever before, individuals and businesses rely upon distributed systems (commonly referred to as "the cloud") to provide computing services and store information and data. As wide strides in technological advancement relating to computing devices have been accomplished, there is an ever-growing demand for growth and development within the back end supporting systems that provide computing services and store data content.

SUMMARY OF THE INVENTION

A computing cluster, referred to as cluster for short, is a type of computer system which completes computing jobs by means of multiple collaborative computers (also known as computing resources such as software and/or hardware resources) which are connected together. These computing resources which are in a same management domain have a unified management policy and provide services to users as a whole. A single computer in a cluster system is usually called a host or a computing node.

The cluster system has many advantages. For example, the cluster system, when working in a load-balance manner, can achieve a higher efficiency through performing a same work by multiple computers. The cluster system may also work in a high availability manner. Once a server, that is acting as a master server of a group of servers, fails, another server of the group of servers can assume the role of the master server and provide services in substitute of the master server, thereby exhibiting a high fault-tolerance.

When scheduling a job, corresponding computing resources are allocated to the job to be processed. This process is referred as job scheduling in a cluster environment. The job scheduling is actually a process for mapping jobs to corresponding resources for execution based on characteristics of the jobs and resources according to scheduling policies.

In cluster computing, the efficiency of these jobs (i.e., workloads) that access and process data depends significantly on the distance, in terms of data access and networking latencies, between the cluster hosts processing the workloads and the cluster hosts storing the data accessed and processed by the workloads. The lower the distance (with regard to lower data access and networking latencies) for accessing data, the higher the efficiency of the workloads.

The objective of the present disclosure is to reduce the latency of accessing data by workloads, by placing workloads close to their data. Specifically, the challenge being addressed in the current disclosure is determining how to combine workload-related knowledge (typically coming from workload management systems) with data storage-related knowledge (typically coming from storage systems) in an efficient and automatic way, to place workloads close to their underlying data and therefore increase the efficiency of the workloads and the computing system as a whole.

Accordingly, and to improve upon the art, various embodiments are disclosed herein for workload management with data access awareness in a computing cluster by a processor. In one embodiment, by way of example only, a method comprises configuring a workload manager within the computing cluster to include a data requirements evaluator module and a scheduler module; and in response to receiving an input workload for scheduling by the workload manager: (i) retrieving, by the data requirements evaluator module, a set of inputs from a storage system, wherein the inputs each include at least one of: (a) data locality proportions for a set of files associated with the input workload, the data locality proportions specifying a respective proportion of a total data size of the set of files associated with the input workload stored on each of a plurality of cluster hosts of the computing cluster, and (b) data access costs specified for each pair of cluster hosts in the computing cluster, wherein the data access costs are computed for an entirety of the computing cluster; and (ii) generating, by the data requirements evaluator module, a list of the cluster hosts ranked for running the input workload according to data access considerations associated with the set of inputs.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
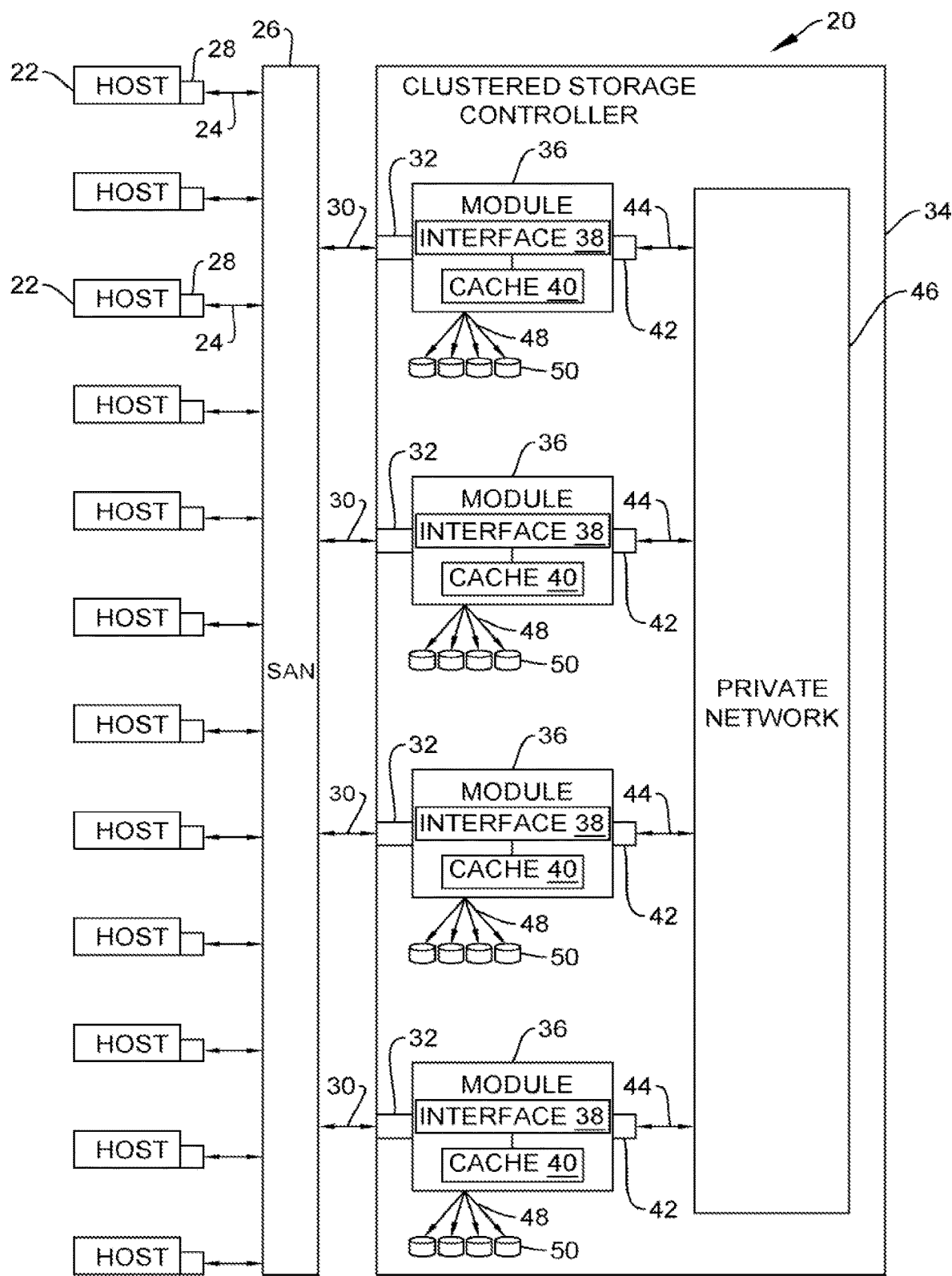
FIG. 1 illustrates a block diagram of a computer storage environment in which aspects of the present invention may be realized.

As previously mentioned, in cluster computing, the efficiency of workloads that access and process data depends significantly on the distance, in terms of data access and networking latencies, between the cluster hosts processing the workloads and the cluster hosts storing the data accessed and processed by the workloads. The lower the distance (with regard to lower data access and networking latencies) for accessing data, the higher the efficiency of the workloads.

The objective of the present disclosure is to reduce the latency of accessing data by workloads by placing workloads close to their data. Specifically, the challenge being addressed in the current disclosure is determining how to combine workload-related knowledge (typically coming from workload management systems) with data storage-related knowledge (typically coming from storage systems) in an efficient and automatic way, to place workloads close to their underlying data and therefore increase the efficiency of the workloads and the computing system as a whole.

Some known scheduling techniques exist which primitively attempt to address some of these challenges. For example, a rack-aware scheduling mechanism in current art exists for MapReduce workloads with the objective of scheduling map tasks at or close to hosts storing the required input data for the tasks. Under this mechanism, the topology of the network is submitted using a user-defined topology script representing the mapping between hosts in the cluster and network groups. The topology is represented as a tree, grouping hosts into racks and racks into data centers. Using this topology, network distances (latency) are determined between hosts. Accordingly, when scheduling a workload, resources are attempted to be allocated from hosts closest to the input data required for the given workload.

Also existing is a data-aware scheduling mechanism using interfaces for service instances and an external plug in. Utilizing this mechanism, user-defined expressions containing data attributes are presented, and logic is inputted by the user for assigning a cost value of accessing a file for a service instance. In this mechanism, the cost values are, again, calculated by logic that is defined and implemented by the user, uses file granularity, and provides no specification of how data locality, data distribution, data attributes and network costs are to be used in the calculation. In other words, all logic under this mechanism depends on unspecified user implementation.

The challenge with existing methods is that these mechanisms rely on user implemented logic and procedures for providing data access costs. Examples of this include the network topology script in rack-aware scheduling and the logic for generating file access cost per service instance in data-aware scheduling. Moreover, these methods use data access costs on file granularity, and it is left up to the user logic to determine how to aggregate this file granularity to workload granularity. The data access costs are also considered to be static, as they are user-entered, and methods such as the rack-aware scheduling use a qualitative measurement of access costs. Furthermore, existing methods typically support specific types of workloads and specific types of I/O patterns for workloads, and are not generic to support the wide range of possible workload types and I/O patterns.

Accordingly, the techniques and algorithms considered herein overcome the limitations of existing methods and provide a more efficient and generic solution with regard to workload scheduling and data locality in clustered computing. These techniques include combining workload-related knowledge, retrieved from a workload management system, with data storage-related knowledge, retrieved from a data storage management system, to produce optimized placement of workloads close to their data. In some embodiments, the relevant workload-related knowledge may include (a) data to be accessed by the workloads; (b) hosts with available compute resources in the cluster; and (c) networking costs between hosts in the cluster. Commensurately, the relevant data storage related knowledge may comprise (a) at what physical location the data accessed by the workloads is stored in the cluster; (b) hosts with available storage resources in the cluster; and (c) data access costs within and across hosts in the cluster.

The considered architecture comprises a cluster of hosts consisting of one or a plurality of hosts that are interconnected with a network and are coordinated to work together. Coordination between the cluster hosts is maintained by at least (a) a workload management system that schedules, controls, and monitors workloads running on hosts in the cluster; and (b) a data storage management system that stores and provides access to data from hosts in the cluster.

In some embodiments within the considered architecture, the data storage management system may store data using at least one of the following methods: (a) data may be stored on local storage devices, where each local storage device is attached to one of the plurality of hosts in the cluster; (b) data may be stored on a shared storage device that is accessible from the hosts in the cluster; and (c) data may be stored on a combination of local and shared storage devices. Moreover, data to be accessed by a given workload may be specified as a list of data files or data objects that is/are associated with and expected to be accessed by the given workload. In various embodiments, locations in the cluster of data accessed by the workloads may be specified for both local storage and shared storage where: (a) shared storage devices have a corresponding host name; (b) local storage devices are attached to hosts which are assigned with host names; and (c) within a shared or local storage device a location is specified using a storage identification (ID).

Based on this, the combination of host name and storage ID hence provides a global storage location in a cluster for both types of storage devices.

Data access costs within and across hosts in the cluster are calculated based on a combination of networking latencies between hosts and storage device access latencies within each host. For instance, the inventive concepts herein disclose several new efficient algorithms, including: (a) an algorithm for scheduling workloads with data access awareness in a cluster of hosts, where the algorithm considers different I/O patterns of workloads for calculating optimized scheduling; (b) an algorithm for calculating an ordered list of preferred hosts for scheduling workloads with data access awareness in the cluster of hosts based on data locality information and data access costs; and (c) an algorithm for aggregating locality information for a large set of files in the cluster of hosts by selecting an efficient subset of files for calculating approximations of the locality aggregations, and defining efficient triggers for updating the approximations of the locality aggregations.

Using the novel algorithms considered herein, limitations of the aforementioned existing methods are overcome while providing a more efficient and generic solution, as (a) all required elements are calculated automatically without requiring user implemented logic, where the automatic calculations include data locality, network costs, overall data access costs, and the optimal workload placement information; (b) data access costs per workload are computed automatically and utilized across the cluster; (c) these data access costs are automatically and dynamically updated when changes occur in the cluster and in the workloads; (d) quantitative measurement of data access costs are utilized (rather than qualitative); (e) various types of workloads are considered and supported; and (f) various types of I/O patterns for workloads are considered and supported (i.e., I/O of existing data, I/O of new data, and workloads which are not I/O intensive). These concepts will be further described in detail, following.

Turning now to FIG. 1, a schematic pictorial illustration of a data processing storage system 20 is shown, in accordance with a disclosed embodiment of the invention. The particular system shown in FIG. 1 is presented to facilitate an explanation of the invention. However, as the skilled artisan will appreciate, the invention can be practiced using other computing environments, such as other storage systems with diverse architectures and capabilities.

Storage system 20 receives, from one or more host computers 22, Input/Output (I/O) requests, which are commands to read or write data at logical addresses on logical volumes. Any number of host computers 22 are coupled to storage system 20 by any means known in the art, for example, using a network. Herein, by way of example, host computers 22 and storage system 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage system 20 may operate in, or as, a SAN system.

Storage system 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connections 48 as shown.

As described previously, each storage module 36 further comprises a given cache 40. However, it will be appreciated that the number of caches 40 used in storage system 20 and in conjunction with clustered storage controller 34 may be any convenient number. While all caches 40 in storage system 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage system 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally, or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage system 20, again as the skilled artisan will appreciate. Further, a variety of software components, operating systems, firmware, and the like may be integrated into one storage system 20.

Figure 2:
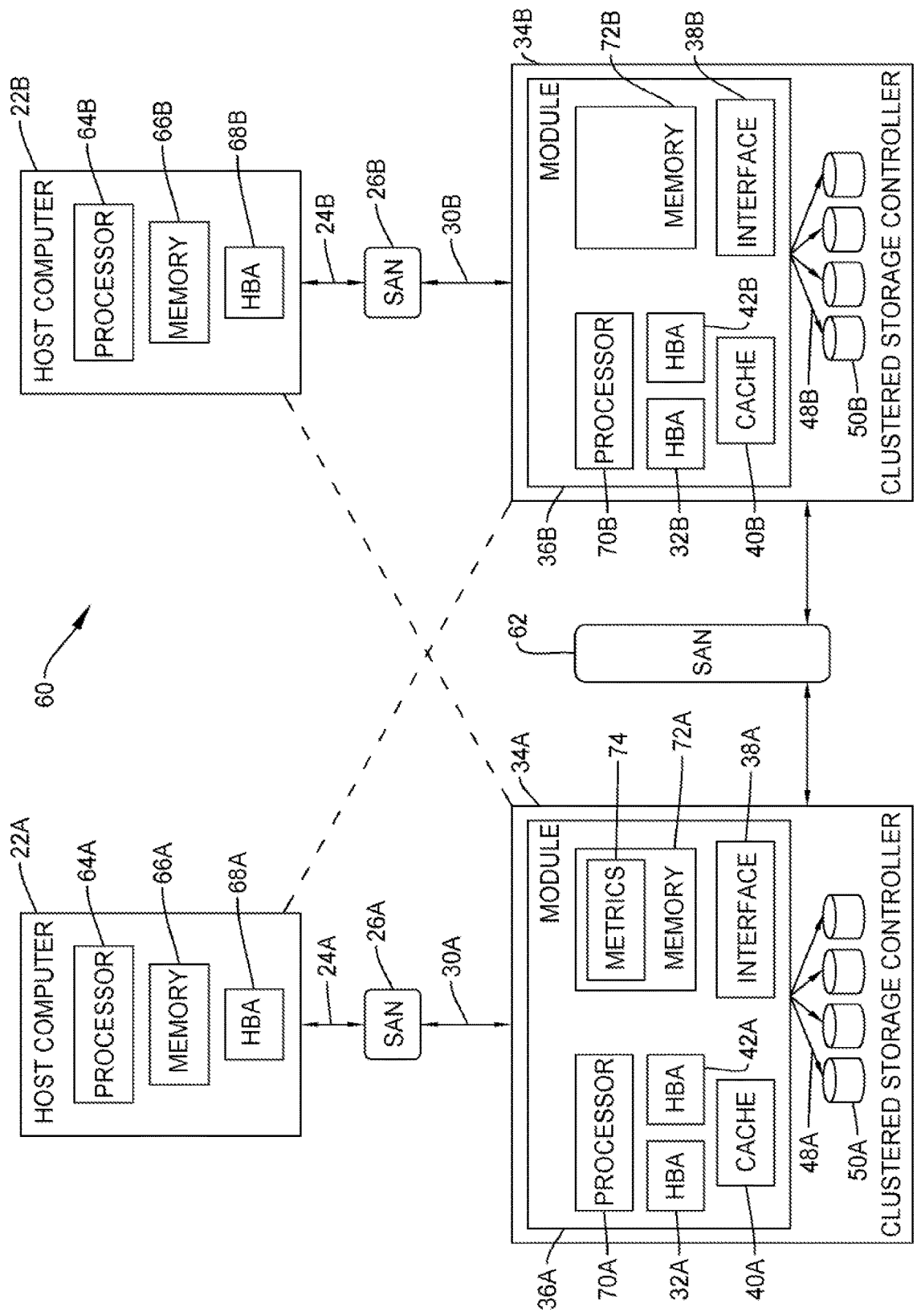
FIG. 2 illustrates a block diagram of a hardware structure of a data storage system in which aspects of the present invention may be realized.

FIG. 2 is a schematic pictorial illustration of facility 60 configured to perform host computer monitoring, in accordance with an embodiment of the present invention. In the description herein, host computers 22, storage controllers 34 and their respective components may be differentiated by appending a letter to the identifying numeral, so that facility 60 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2 storage controllers 34A and 34B are coupled via a facility SAN 62. In other embodiments, as will be described herein, the first host computer 22A may be directly connected to the clustered storage controller 34B, and the second host computer 22B may be directly connected to the clustered storage controller 34A via a SAN similar to SAN 62, a virtualized networking connection, or any other computer implemented medium.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A. Module 36A also comprises a processor 70A and a memory 72A. As explained in detail hereinbelow, processor 70A is configured to establish metrics 74 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70B and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (iSCSI) adapters, Fibre Channel over Ethernet (FCoE) adapters and Infiniband™ adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

It is further understood in advance that although this disclosure includes a detailed description on cloud computing, following, that implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes and storage systems (e.g. storage system 20).

Figure 3:
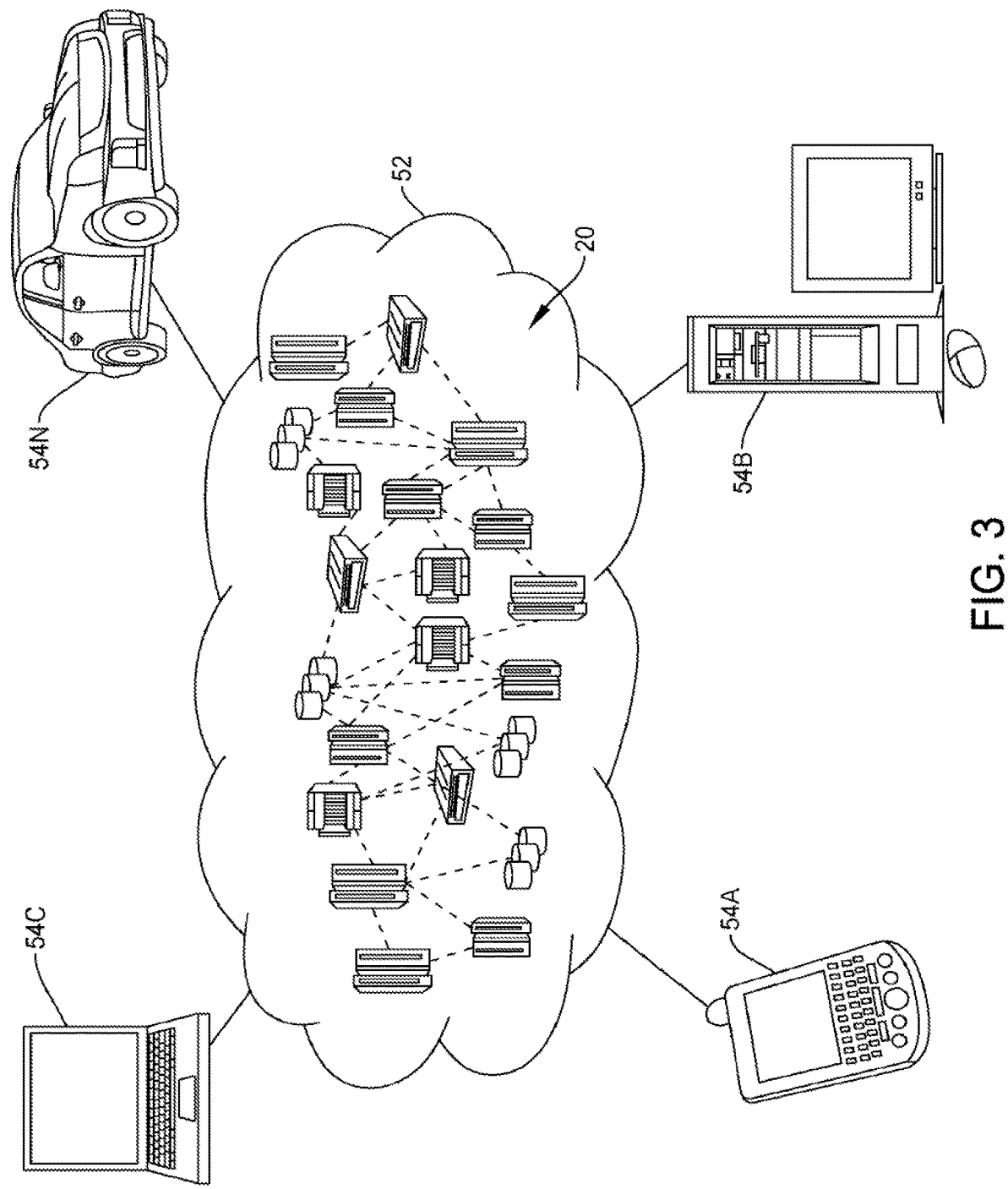
FIG. 3 illustrates a block diagram of an exemplary cloud computing environment according to embodiments of the present invention.

Referring now to FIG. 3, illustrative cloud computing environment 52 is depicted. As shown, cloud computing environment 52 comprises one or more storage systems 20 and cloud computing nodes with which local computing devices used by cloud consumers, such as, for example, personal digital assistant (PDA) or cellular telephone 54A, desktop computer 54B, laptop computer 54C, and/or automobile computer system 54N may communicate. Storage systems 20 and the cloud nodes may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 3 are intended to be illustrative only and that storage systems 20, cloud computing nodes and cloud computing environment 52 can communicate with any type of computerized device over any type of network and/or network addressable connection (e.g., using a web browser).

Figure 4:
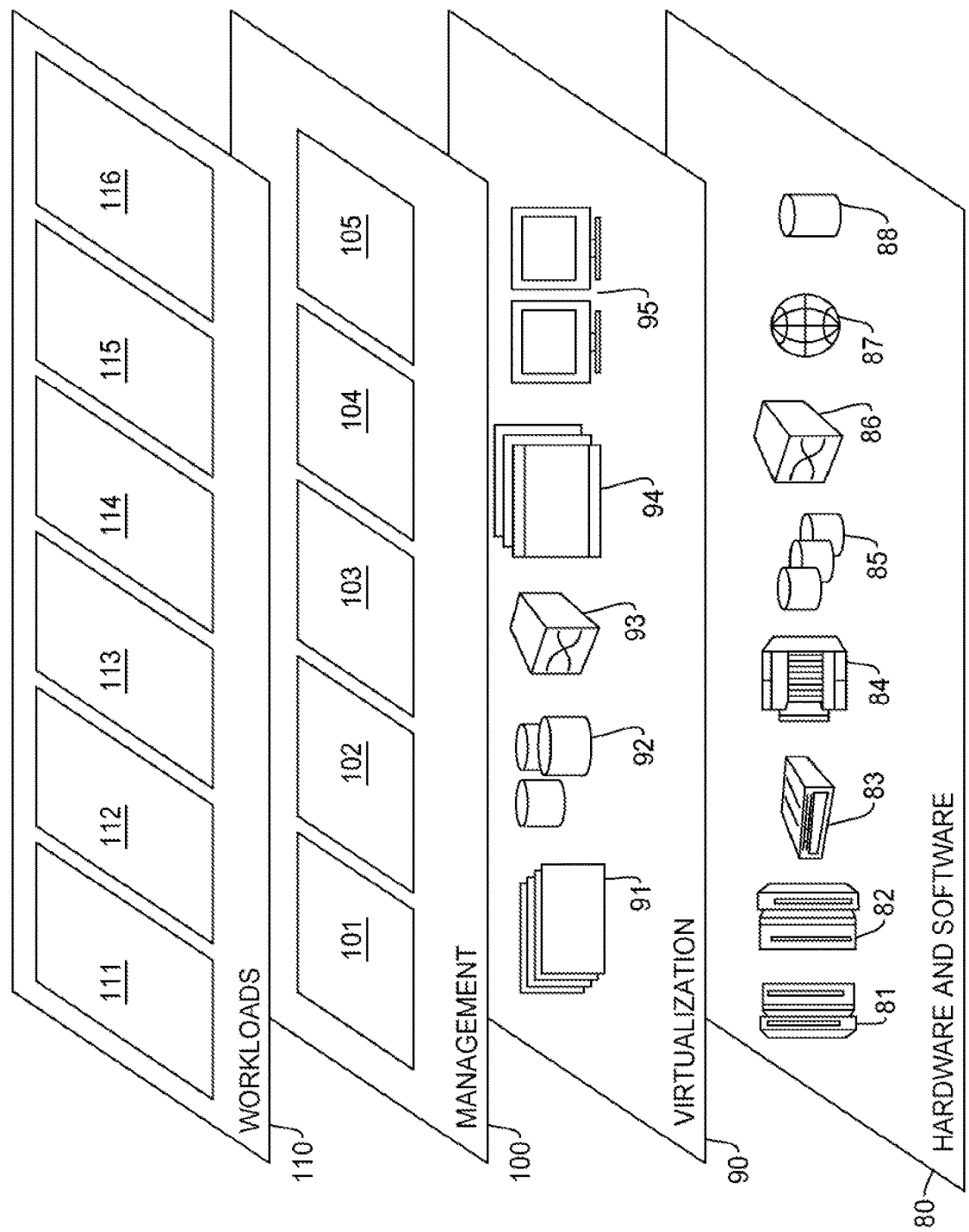
FIG. 4 illustrates a block diagram depicting abstraction model layers according to embodiments of the present invention.

Referring now to FIG. 4, a set of functional abstraction layers provided by cloud computing environment 52 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 80 includes hardware and software components. Examples of hardware components include: mainframes 81; RISC (Reduced Instruction Set Computer) architecture based servers 82; servers 83; blade servers 84; storage devices 85; and networks and networking components 86. In some embodiments, software components include network application server software 87 and database software 88.

Virtualization layer 90 provides an abstraction layer from which the following examples of virtual entities may be provided: virtual servers 91; virtual storage 92; virtual networks 93, including virtual private networks; virtual applications and operating systems 94; and virtual clients 95.

In one example, management layer 100 may provide the functions described below. Resource provisioning 101 provides dynamic procurement of computing resources and other resources that are utilized to perform tasks within the cloud computing environment. Metering and Pricing 102 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 103 provides access to the cloud computing environment for consumers and system administrators. Service level management 104 provides cloud computing resource allocation and management such that required service levels are met. Service Level Agreement (SLA) planning and fulfillment 105 provides pre-arrangement for, and procurement of, cloud computing resources for which a future requirement is anticipated in accordance with an SLA.

Workloads layer 110 provides examples of functionality for which the cloud computing environment may be utilized. Examples of workloads and functions which may be provided from this layer include: mapping and navigation 111; software development and lifecycle management 112; virtual classroom education delivery 113; data analytics processing 114; transaction processing 115; and, in the context of the illustrated embodiments of the present invention, various workload and job scheduling functions 116. One of ordinary skill in the art will appreciate that the workload and job scheduling functions 116 may also work in conjunction with other portions of the various abstractions layers, such as those in hardware and software 80, virtualization 90, management 100, and other workloads 110 (such as data analytics processing 114, for example) to accomplish the various purposes of the illustrated embodiments of the present invention.

Figure 5:
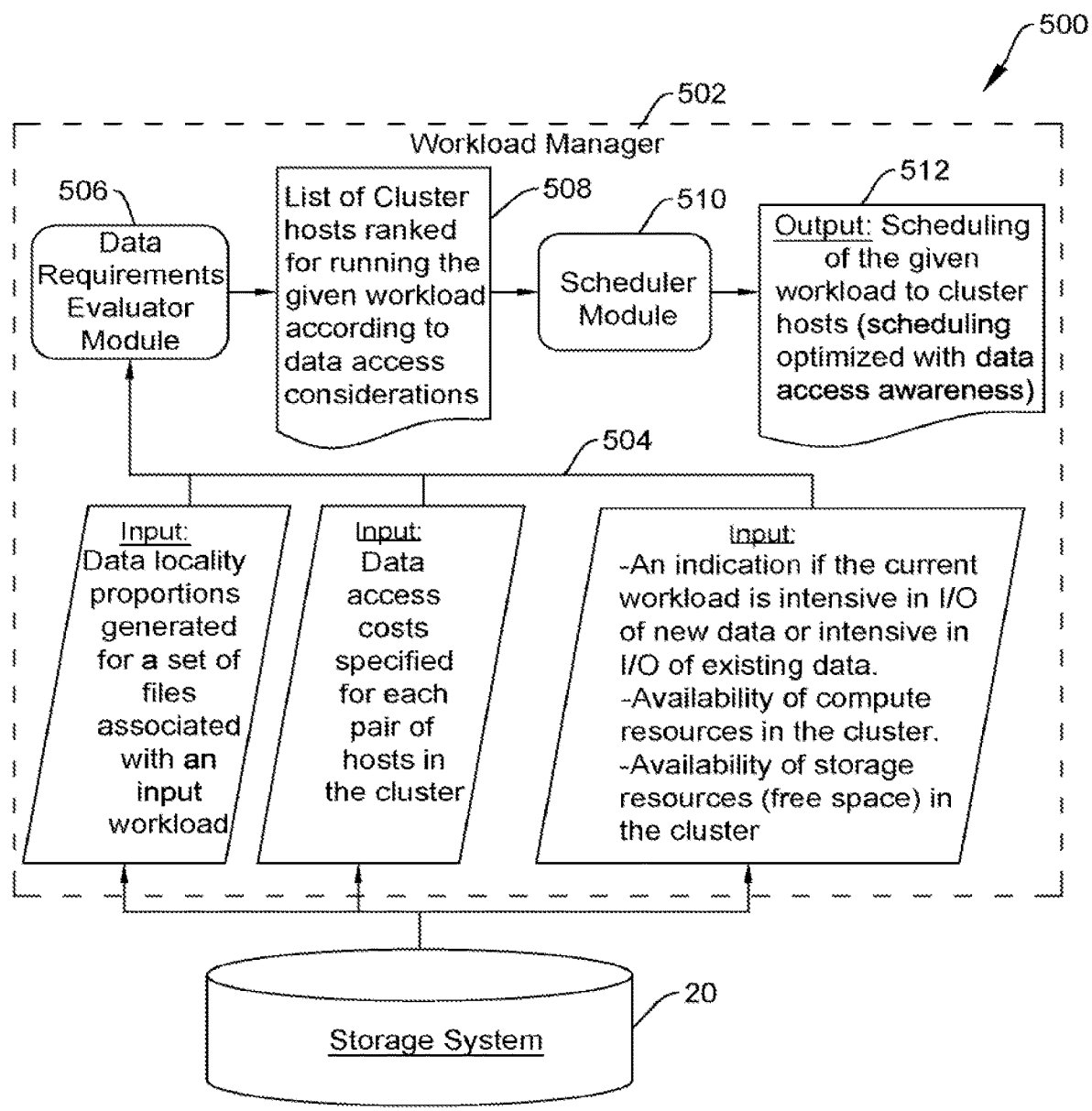
FIG. 5 illustrates a block diagram of an architecture for job scheduling and workload management in a computing cluster, in accordance with aspects of the present invention.

As aforementioned, the resultant goal of the mechanisms described herein is to generate a scheduling of a given workload to cluster hosts optimized with data access awareness, such that the workload is performed within the cluster hosts with which the data required to be accessed by the workload is most optimally available or attainable relative to other cluster hosts. To realize this goal, an architecture 500 for workload management and scheduling in a computing cluster is presented in FIG. 5.

The architecture 500 includes the storage system 20 as previously described which is in communication with a workload manager 502 having multiple modules contained therein, including at least a data requirements evaluator module 506 and a scheduler module 510. It should be noted that, as one of ordinary skill in the art would appreciate, the multiple modules described in architecture 500 (i.e., the data requirements evaluator module 506 and scheduler module 510) may be each comprised of computer-executable code portions or may be comprised of one or more physical hardware module(s) within the distributed computing environment, to accomplish the functionality presented herein. Moreover, the workload manager 502 may include further, additional modules than those instantly disclosed.

In various embodiments, the data requirements evaluator module 506 receives at least three types of input (referenced as blocks 504) from the storage system 20 and from other modules in the workload manager 502, as will be described. The data requirements evaluator module 506 then generates a list of cluster hosts ranked for running the given workload according to data access considerations associated with the received inputs from the respective modules.

A first input 504 received by the data requirements evaluator 506 may include data locality proportions generated for a set of files associated with a given workload. This data locality proportions input specifies, for the set of files associated with the given workload, the proportion of the total data of the set of files that is stored on each of the hosts in the cluster. In other words, the data locality proportions input indicates which proportion of the total data of the set of files is stored on differing respective hosts storing the underlying data.

A second input 504 received by the data requirements evaluator 506 may include data access costs specified for each pair of hosts in the cluster. This data access costs input specifies, for each host in the cluster, the cost (e.g., with regard to latency and other considerations) of accessing data stored on any other host in the cluster.

In addition to the aforementioned inputs, further inputs 504 may be received by the data requirements evaluator module 506 specified herewith, including: (a) an indication as to whether the current workload is intensive in I/O of new data or intensive in I/O of existing data. This indication input can typically be retrieved from other modules in the workload manager 502 that track certain information on workload attributes, and/or from the storage system 20 which may track information on workload I/O patterns; (b) an availability of compute resources in the cluster. This input can typically be retrieved from other modules in the workload manager 502 that track compute resources availability in the cluster; and (c) an availability of storage resources (free storage space) in the cluster. This input can typically be retrieved from the storage system 20. Given the inputs specified previously, the data requirements evaluator module 506 then uses the information associated with each input to generate the list of cluster hosts ranked for running the given workload according to the data access considerations.

In various embodiments, the scheduler module 510 receives, from the data requirements evaluator module 506, the list of cluster hosts ranked for running the given workload according to the data access considerations, and subsequently generates as output 512 a scheduling of the given workload to certain cluster hosts, where the output scheduling is optimized with data access awareness.

In various embodiments, the storage system 20 stores the underlying data required to perform the given workload, provides access to this data, and provides the aforementioned inputs to the various modules in the workload manager 502.

Data Requirments Evalutor Algorithm

Figure 6:
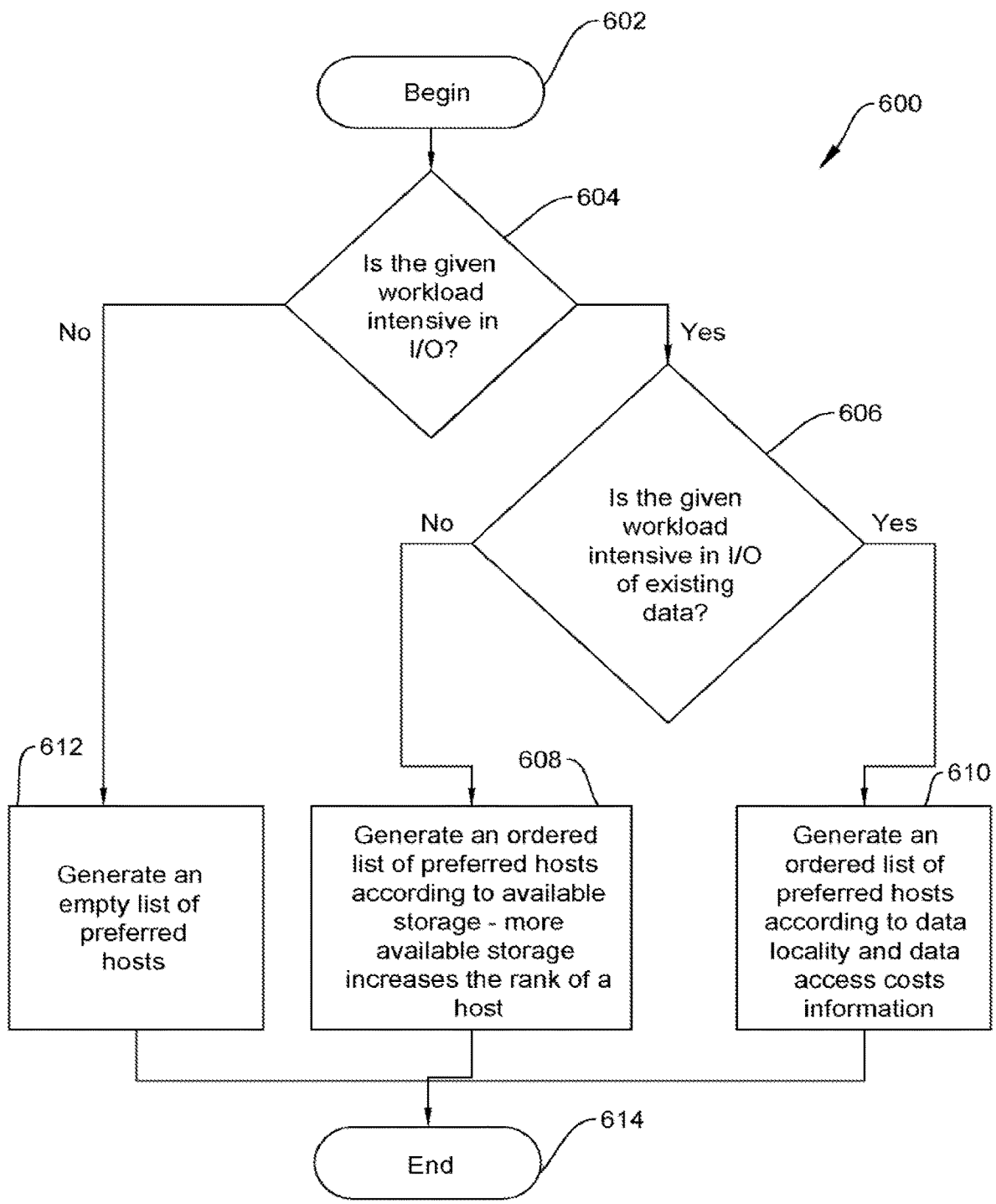
FIG. 6 illustrates a flowchart diagram illustrating an exemplary method for evaluating data requirements of workloads in the computing cluster, in accordance with aspects of the present invention.

FIG. 6 illustrates a flowchart diagram illustrating an exemplary method/algorithm 600 for evaluating data requirements of workloads in the computing cluster, in accordance with aspects of the present invention. More specifically, the method 600 specifies the considered algorithm applied by the data requirements evaluator module 506 to generate the list of cluster hosts ranked for running the given workload according to the data access considerations. The algorithm of the data requirements evaluator module 506 handles at least three exemplary scenarios specified herewith.

The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

In a first scenario, the workload is intensive in I/O of existing data. That is, the workload is determined to be intensive in utilizing existing data stored in, for example, the storage system 20. Thus, beginning at block 602 and provided that the given workload is indeed intensive in I/O at block 604, and further upon determining that the workload is intensive in I/O of the existing data in block 606, the algorithm 600 generates an ordered list of preferred hosts according to data locality and data access costs information in block 610. The method 600 then ends in block 614.

In a second scenario, the workload is intensive in I/O of new data. That is, the workload is determined to be intensive in creating new data to be stored in, for example, the storage system 20. Thus, returning to block 604 where it is determined that the given workload is indeed intensive in I/O, and further upon determining that the workload is intensive in creating new data in block 606, the algorithm 600 generates an ordered list of preferred hosts according to available storage in block 608. Specifically, the more available storage space associated with a host when compared to other hosts in the cluster, the higher the ranking of this host with the more available storage space is in the generated list when compared with the other hosts of the list. The method 600 then ends in block 614.

In the third scenario, the workload is determined not to be intensive in I/O. Thus, returning to block 604 where it is determined that the workload is not intensive in I/O, the algorithm 600 generates an empty list of preferred hosts, to indicate that there are no preferred hosts based on data access considerations. The method 600 then ends in block 614.

Generating an Ordered List of Preferred Hosts According to Data Locality and Data Access Costs Information Following, the considered algorithm for generating the ordered list of preferred hosts according to the data locality and data access costs information is specified, and is applied by the data requirements evaluator module 506 to handle the scenario of workloads that are determined to be intensive in I/O of existing data. The algorithm receives as input data locality proportions and data access costs (both inputs discussed in further detail in the following), and generates as output an ordered list of preferred hosts that is specifically optimized for such workloads intensive in I/O when utilizing existing data stored in the storage system 20.

Input: Data Locality Proportions

In some embodiments, a first input received by the algorithm of the data requirements evaluator module 506 is the data locality proportions generated for the set of files associated with the given workload. This data locality proportions input specifies, for the set of files associated with the given workload, the proportion of the total data of the set of files that is stored on each of the cluster hosts. To generate this input, locality information for each file (i.e., the proportion of the data of each file stored on each of the cluster hosts) is aggregated to the level of the set of files associated with the workload.

In this embodiment, for each host in the cluster a value is calculated, ranging from 0 (indicating that no data of the set of files is stored on the host) to 1 (indicating that all the data of the set of files is stored on the host). It should be noted that it is possible for a section of data to be stored on multiple hosts in the cluster. Further, it should be noted that the reference hereinafter of D[Hi] denotes the proportion of the total size of the set of files associated with the workload that is stored on host Hi (as will be further described within the second and third inputs, following).

Figure 7:
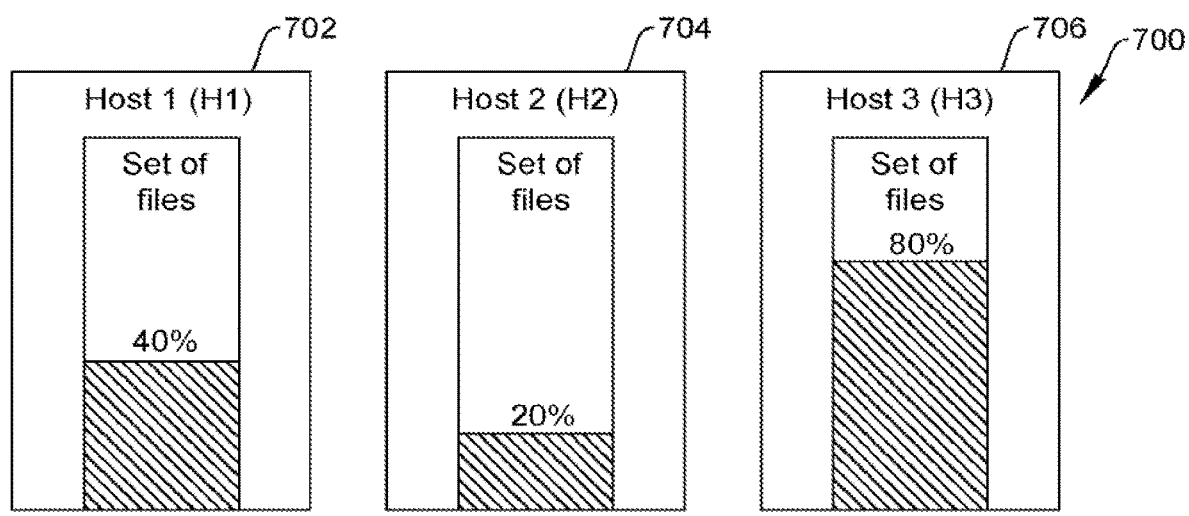
FIG. 7 illustrates a block diagram of data locality proportions for a given set of files of a workload within the computing cluster, in accordance with aspects of the present invention.

FIG. 7 illustrates a block diagram of an example of the data locality proportions input 700 for a given set of files of a workload within the computing cluster. This example of the input 700 shows three hosts in the cluster, namely Host 1 (block 702), Host 2 (block 704), and Host 3 (block 706). The total size of a set of files associated with a given workload is shown as an aggregated bar that includes a demarked bar and a lined bar, where the aggregated bar represents 100% of the total size of the set of files. The proportion of the total size of the set of files associated with the given workload that is stored on each host (referenced as a percentage) is therefore shown as a lined bar under each demarked bar, illustrated for Host 1 (702) or D[H1] having 40% of the total data of the set of files or a value of 0.4; for Host 2 (704) as D[H2] having 20% of the total data of the set of files or a value of 0.2; and for Host 3 (706) as D[H3] having 80% of the total data of the set of files or a value of 0.8. Note in this example that, as referenced above, the total percentage (40%+20%+80%) of all the hosts equals a percentage greater than 100%, as a section of the data of the set of files may be stored within multiple hosts in the cluster.

Input: Data Access Costs

In some embodiments, a second input received by the algorithm of the data requirements evaluator module 506 is the data access costs specified for each pair of hosts in the cluster. This information is calculated for the entire cluster, or in other words, data access costs are evaluated for each pair of hosts in the entire cluster. For a current cluster topology, this calculated information is static, however upon determining a topology change in the cluster has taken place (e.g., addition/removal of hosts to the cluster), the data access costs information for the new cluster topology is updated within the data requirements evaluator module 506.

As aforementioned, the data access costs information is calculated for each pair of hosts in the cluster and may be represented in a matrix, where the matrix notation may be:

$C[H_i, H_j]$=Cost of accessing data stored in host $H_j$ from host $H_i$

The value range for each cell in the matrix may range from 0 to 1, where 0=local host access, and 1=a maximum network access cost (e.g., a maximum network access cost beyond a predetermined latency threshold). In various embodiments, the data access costs may be calculated automatically using existing functionality that runs on each host by performing I/O to each of the other hosts in the cluster, measuring a latency of the I/O, and computing statistical metrics thereof. When a new host joins the cluster, this functionality should run on the new host in addition to each of the existing hosts in the cluster to measure the latency to the new host. Moreover, a further option may comprise tracking ongoing data related networking between the cluster hosts and inferring data access costs based on this information.

The following table 100 shows an example of data access costs for 3 hosts in a cluster using the value range previously specified. In this example, hosts 2 and 3 are closer to each other (i.e., having a value range less than 1), and host 1 is farther especially from host 3 (i.e., having a value range of 1).

TABLE 100

| Hosts | 1   | 2   | 3   |
|-------|-----|-----|-----|
| 1     | 0   | 0.5 | 1   |
| 2     | 0.5 | 0   | 0.2 |
| 3     | 1   | 0.2 | 0   |

Calculating an Ordered List of Preferred Hosts

In various embodiments and given the aforementioned two inputs, the algorithm of the data requirements evaluator module 506 then generates the ordered list of preferred hosts for running (executing) the given workload. The ordering of the hosts is generated based on, for each host $H_i$, the computation of an expected cost for data access for a workload running on the host $H_i$ according to the following proposed formula:

$$\underbrace{EC[H_i]}_{\substack{\text{Expected cost for} \\ \text{data access for} \\ \text{a workload running} \\ \text{on host Hi.}}} = \underbrace{(1 - D[H_i])}_{\substack{\text{Probability of} \\ \text{retrieving data} \\ \text{from a host} \\ \text{other than } H_i.}} \times \underbrace{\sum_{j \in cluster \wedge j \neq i} \left\{ \underbrace{P[H_j / H_i]}_{\substack{\text{Probability of} \\ \text{retrieving data} \\ \text{from host } H_j \\ \text{by a workload} \\ \text{running on} \\ \text{host } H_i.}} \times \underbrace{C[H_i, H_j]}_{\substack{\text{Cost of} \\ \text{retrieving data} \\ \text{from host } H_j \\ \text{by a workload} \\ \text{running on} \\ \text{host } H_i.}} \right\}}_{\text{Expected cost of retrieving data from a host other than host } H_i.}$$

The prescribed formula enables the computation of an expected cost for data access for a workload running on host $H_i$, denoted as $EC[H_i]$, by multiplying the expected cost of retrieving data from a host other than host $H_i$ with the probability of this event (i.e., the probability of retrieving data from the host other than host $H_i$). It is additionally assumed, as specified previously, that the cost of data access on host $H_i$ (i.e., the local host) is zero in terms of network latency.

As noted in the given formula, the probability of retrieving data from a host other than host $H_i$ is given by the proportion of the total size of the set of files associated with the given workload which is not stored on host $H_i$. This element may be computed based on the data locality proportions input previously described. Further, the expected cost of retrieving data from a host other than host $H_i$ is given by summarizing, over all hosts in the cluster other than host $H_i$, the cost of retrieving data from a host $H_j$ by a workload running on host $H_i$ multiplied by the probability of retrieving data from host $H_j$ by a workload running on host $H_i$. A proposed method for calculating this probability is specified in the following formula:

$$P[H_j/H_i] = \underbrace{\frac{D[H_j]}{\sum_{k \in cluster \wedge k \neq i}\{D[H_k]\}}}_{\substack{\text{Proportion of the data} \\ \text{portion stored in host } H_j \\ \text{relative to the total} \\ \text{data proportions stored} \\ \text{on all hosts other than} \\ \text{host } H_i.}}$$

In this formula for computing the probability, the probability of retrieving data from host $H_j$ by a workload running on host $H_i$ is calculated by dividing the proportion of the data portion that is stored on host $H_j$ with the total data proportions stored on all hosts in the cluster other than host $H_i$. To produce an output ordered list of preferred hosts that is optimized for workloads intensive in I/O of existing data, the hosts are ordered based on an ascending order of their calculated EC $[H_i]$ values. Namely, the lower the $EC[H_i]$ value of a host $H_i$, the higher is the preference for host $H_i$ to be selected for running the given workload.

Workload Manager Algorithm

In some embodiments, the scheduler module 510 of the workload manager 502 receives a resource allocation request for performing the given (input) workload, accompanied by the ordered list of preferred hosts ranked for running the given workload according to data access considerations, computed by the data requirements evaluator module 506.

The scheduler module 510 then attempts to allocate compute resources from the preferred hosts according to the resource allocation request associated with the given workload and the ordered list of preferred hosts (provided the list is not empty), to satisfy the allocation request. The output of the scheduler module 510 is a scheduling of the given workload to cluster hosts, where the scheduling is optimized with data access awareness, and the given workload is performed using the allocated compute resources within these hosts of the cluster.

Aggregating File Level Locality Information to the Level of the Set of Files

In various embodiments, an algorithm for aggregating the locality information from a file level to the level of a set of files is performed in accordance with the following.

(1) First, a set of storage size counters is reset, where each counter is assigned to a host in the cluster. Further, an overall storage size counter is additionally reset for the cluster. These counters specify the data size of the proportion of data stored on each host of the cluster. (2) All the files in the set are subsequently scanned, and for each file: (a) the locality information of the current file is retrieved (i.e., the data size of the file stored on each of the cluster hosts). This information is typically obtained from the storage system 20; (b) the locality information of the current file is added to the storage size counters of the hosts; and (c) the total size of the current file is added to an overall storage size counter. (3) The proportion of the storage size counter of each host from the overall storage size counter is then computed.

In cases where a set of files associated with a given workload is large, it may be prohibitive in terms of performance to query the locality information of each individual file of the set of files. For such cases of a large set of files (i.e., a set of files where the number of files in the set is over a predetermined threshold), the following optimizations are considered. One optimization may include computing and maintaining approximations of the locality information for the set of files. For example, the approximations may be based on querying a subset of the files from the set of files, where the subset of files can be any combination of the following criteria: (a) the K largest files of the set of files; (b) the L files characterized with the highest I/O access; and/or (c) the M files having the most recent I/O access.

In this example, where K, L, and M are predetermined values being smaller than the total number of files in the set of files. The values of K, L, and M should be selected such that the typical cost and/or time for querying the locality information of the resulting number of files will be no larger than an acceptable threshold. Since the metrics of size, I/O access patterns and access recency of files are dynamic over time, these metrics may be calculated as statistical values for a recent window of time.

In some embodiments, a combination of the described criteria may be computed, for example, by calculating for each file a weighted aggregated metric based on the file's metrics for each of the criteria. The considered technique therefore selects a subset of files from the set of files based on the given criteria, queries the locality information for the files in the subset of files, aggregates this information, and updates the approximations of the locality information for the full set of files based on this information. The approximations may additionally be maintained and associated with a type (or template) of a workload, rather than a specific instance of a workload that is submitted for execution.

To further reduce the overhead of querying the locality information, further proposed is a method for defining triggers for updating the approximations of the locality information for the set of files. Defining triggers for updating the approximations of the locality information may be based on any combination of the following criteria, such that the triggers may include: (a) a registration of a type (or template) of a workload; (b) a request to deploy an instance of a workload type to run in the cluster; and/or (c) the detection of an elapsed time period from the previous update of the approximations exceeds a specified threshold. An example trigger may therefore comprise a request to deploy an instance of a workload type, where the request is submitted at a time whose difference from the latest update time is not smaller than the specified threshold.

Figure 8:
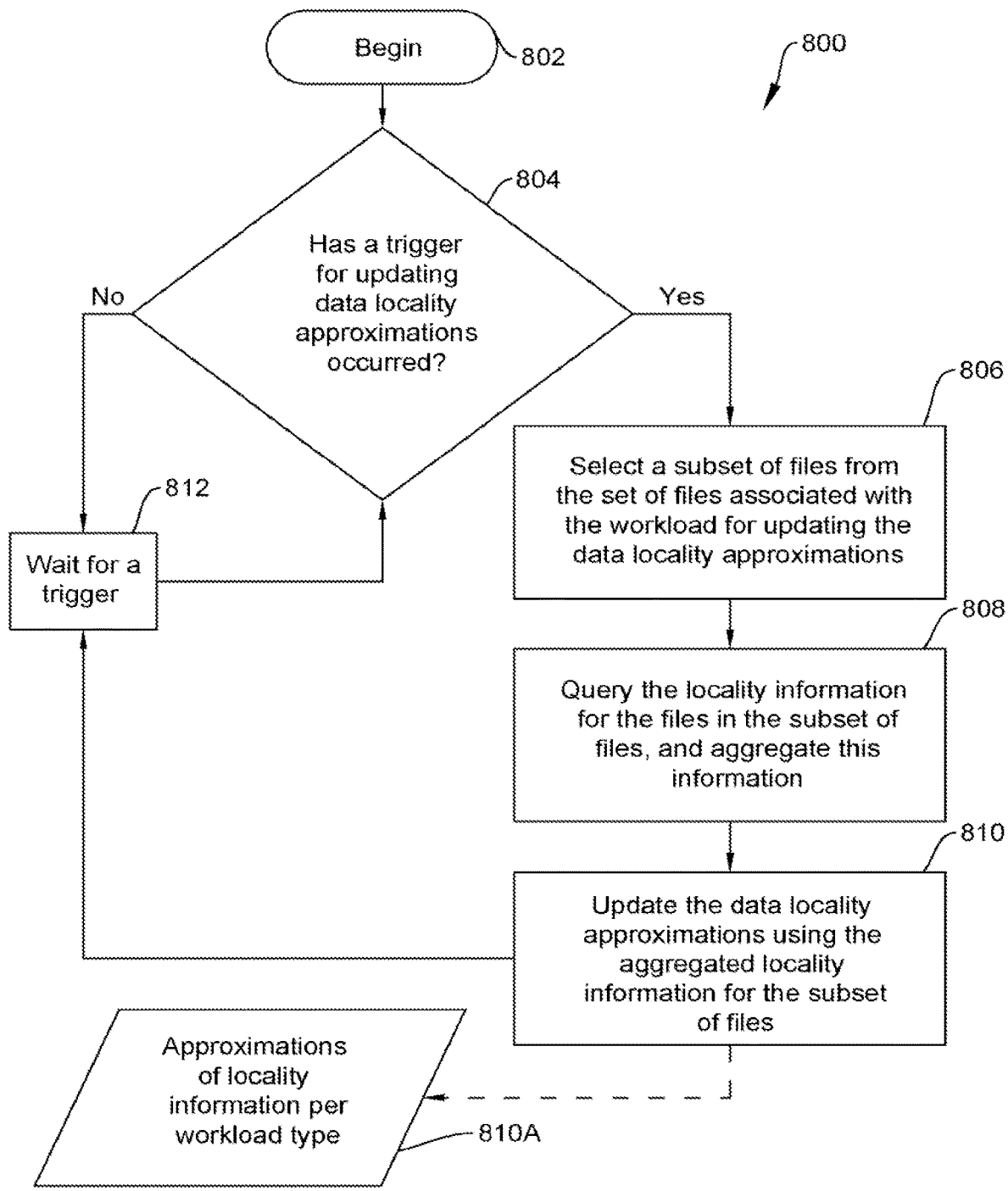
FIG. 8 illustrates a flowchart diagram illustrating an exemplary method of an algorithm for computing data locality information associated with the given workload in the computing cluster, in accordance with aspects of the present invention.

FIG. 8 illustrates a flowchart diagram illustrating an exemplary method of the algorithm for computing data locality information associated with the given workload in the computing cluster, illustrating the aforementioned concepts. The method 800 may be performed in accordance with the present invention in any of the environments depicted in FIGS. 1-4, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

The method 800 begins in block 802 by determining whether a trigger (based on the criteria specified previously) for updating data locality approximations has occurred (block 804). If no trigger has been detected, the method 800 proceeds to wait for a trigger in block 812 and returns to block 804. If, at block 804, a trigger has been detected, a subset of files from within the set of files associated with the workload is selected for updating the data locality approximations in block 806. Locality information for these files within the subset of files is queried, and this locality information is aggregated from the file level to the level of the subset of files in block 808. Finally, the data locality approximations are updated within the data requirements evaluator module 506 in block 810 using the aggregated locality information for the subset of files, and the method 800 proceeds to wait for another triggering event in block 812. Of note and as previously specified, the data locality approximations may be associated with a type (or template) of a workload, rather than a specific instance of a workload that is submitted for execution, as referenced in block 810A.

Figure 9:
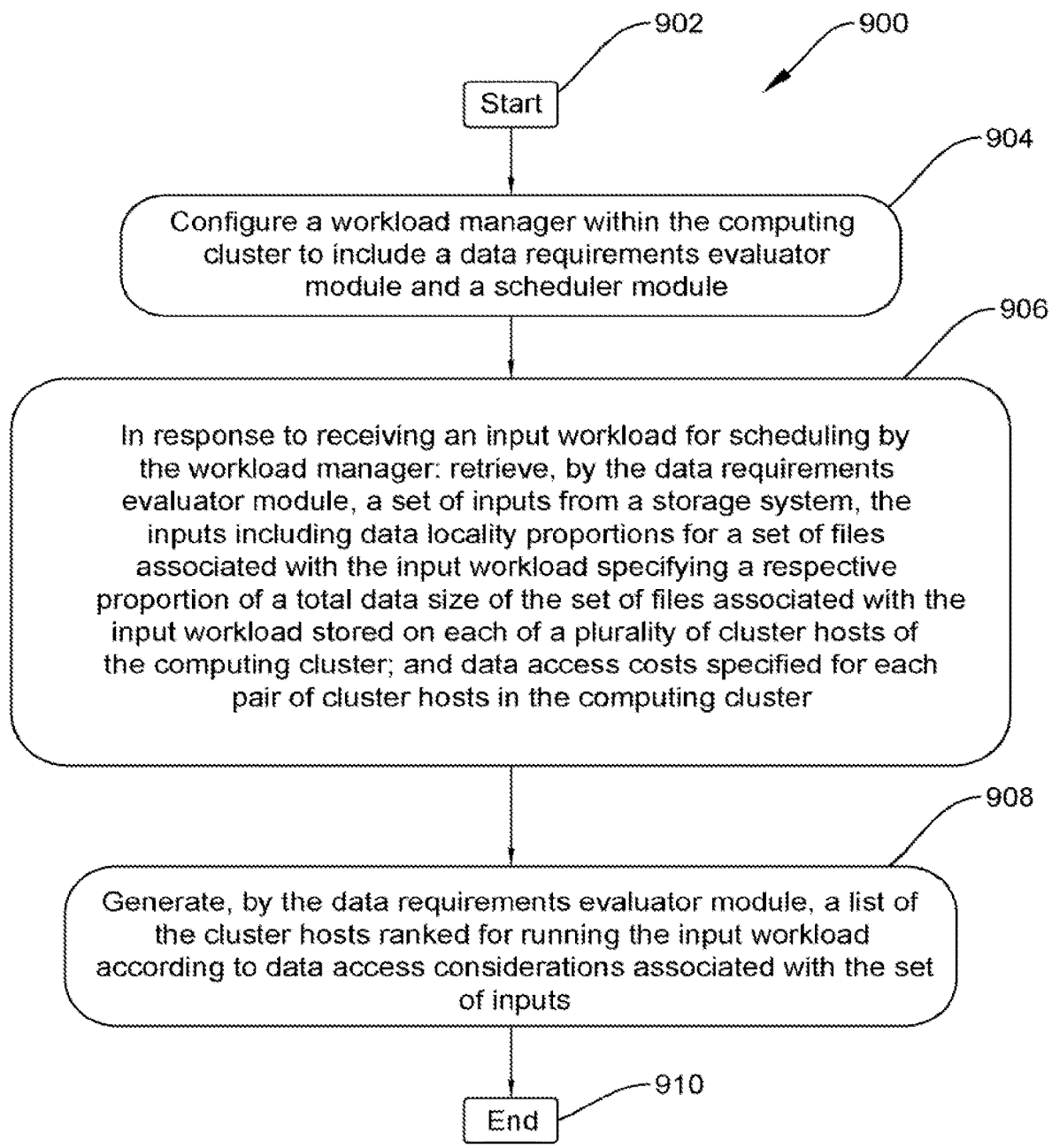
FIG. 9 illustrates an additional flowchart diagram illustrating an exemplary method for workload management with data access awareness in the computing cluster, by which aspects of the present invention may be implemented.

FIG. 9 illustrates an additional flowchart diagram illustrating an exemplary method for workload management with data access awareness in the computing cluster, by which aspects of the present invention may be implemented. The method 900 may be performed in accordance with the present invention in any of the environments depicted in FIGS. 1-4, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

The method 900 begins in block 902 by configuring a workload manager within the computing cluster to include a data requirements evaluator module and a scheduler module, as in block 904. In response to receiving an input workload for scheduling by the workload manager: the data requirements evaluator module retrieves a set of inputs from a storage system, wherein the inputs each include at least one or more of (a) data locality proportions for a set of files associated with the input workload, the data locality proportions specifying a respective proportion of a total data size of the set of files associated with the input workload stored on each of a plurality of cluster hosts of the computing cluster, and (b) data access costs specified for each pair of cluster hosts in the computing cluster, wherein the data access costs are computed for an entirety of the computing cluster, as in block 906. The data requirements evaluator module subsequently generates a list of cluster hosts ranked for performing the input workload according to data access considerations in block 908. The method 900 ends in block 910.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for workload management with data access awareness in a computing cluster, by a processor, comprising:
   configuring a workload manager within the computing cluster to include a data requirements evaluator module and a scheduler module;
   in response to receiving an input workload for scheduling by the workload manager:
      retrieving, by the data requirements evaluator module, a set of inputs from a storage system, wherein the inputs each include at least one of:
         data locality proportions for a set of files associated with the input workload, the data locality proportions respectively stored on each of a plurality of cluster hosts of the computing cluster, and
         data access costs specified for each pair of cluster hosts in the computing cluster; and
      generating, by the data requirements evaluator module, a list of the cluster hosts ranked for running the input workload according to data access considerations associated with the set of inputs.

2. The method of claim 1, further including generating the data locality proportions for the set of files associated with the input workload by aggregating the respective proportion of data of each file stored on each of the cluster hosts to a level of the set of files associated with the input workload; and
   computing for each respective host of the cluster hosts a value ranging from a minimal value indicating that no data of the set of files is stored on the respective host, to a maximal value indicating that all the data of the set of files is stored on the respective host.

3. The method of claim 1, further including representing the data access costs for each pair of cluster hosts in a matrix; wherein values in each cell in the matrix range from a minimal value indicating that a row and column in the matrix specify a same cluster host, to a maximal value indicating a maximal network access cost; wherein the maximal network access cost is determined when a network access cost is greater than a defined latency threshold.

4. The method of claim 3, further including computing the data access costs automatically by using functionality running on each host; wherein the functionality at least one of:
   performs input/output (I/O) from a respective cluster host to each of the other cluster hosts;
   measures I/O latency of the performed I/O;
   calculates statistical metrics of the I/O latency; and
   runs on a new host that joins the computing cluster in addition to running on each of the existing cluster hosts to measure latency to the new host.

5. The method of claim 1, further including ordering the cluster hosts in the list of cluster hosts by computing, for each cluster host, an expected cost for data access for the input workload, and ordering the cluster hosts in the list according to the order of the expected cost for data access for the input workload;
   wherein computing for a first cluster host the expected cost for data access for the input workload running on the first cluster host comprises multiplying a total of expected costs of retrieving data from other cluster hosts different from the first cluster host with a probability of retrieving the data from the other cluster hosts.

6. The method of claim 5, wherein at least one of:
the probability of retrieving data from the other cluster hosts different than the first cluster host is computed as the proportion of the total data size of the set of files associated with the input workload which is not stored on the first host; and
the probability of retrieving data from the other cluster hosts different than the first cluster host is computed based on the data locality proportions input.

7. The method of claim 6, wherein at least one of:
the expected costs of retrieving data from other cluster hosts different than the first cluster host is computed by summarizing, over all cluster hosts different than the first cluster host, a cost of retrieving data used by the input workload from one of the other cluster hosts different than the first cluster host multiplied by the probability of retrieving the data from the other cluster hosts different than the first cluster host;
the cost of retrieving the data from the other cluster hosts different than the first cluster host by the input workload running on the first host is based on the data access costs information; and
the probability of retrieving data from a second host different than the first host by the input workload running on the first host is computed by dividing the respective proportion of the data stored on the second host with the total data proportions stored on all cluster hosts different than the first host.

8. A system for workload management with data access awareness in a computing cluster, the system comprising:
a workload manager within the computing cluster, the workload manager including a data requirements evaluator module and a scheduler module; and
a processor executing instructions stored in a memory device, wherein the processor, upon executing the instructions:
in response to receiving an input workload for scheduling by the workload manager:
retrieves, by the data requirements evaluator module, a set of inputs from a storage system, wherein the inputs each include at least one of:
data locality proportions for a set of files associated with the input workload, the data locality proportions respectively stored on each of a plurality of cluster hosts of the computing cluster, and
data access costs specified for each pair of cluster hosts in the computing cluster; and
generates, by the data requirements evaluator module, a list of the cluster hosts ranked for running the input workload according to data access considerations associated with the set of inputs.

9. The system of claim 8, wherein the processor generates the data locality proportions for the set of files associated with the input workload by aggregating the respective proportion of data of each file stored on each of the cluster hosts to a level of the set of files associated with the input workload; and
computes for each respective host of the cluster hosts a value ranging from a minimal value indicating that no data of the set of files is stored on the respective host, to a maximal value indicating that all the data of the set of files is stored on the respective host.

10. The system of claim 8, wherein the processor represents the data access costs for each pair of cluster hosts in a matrix; wherein values in each cell in the matrix range from a minimal value indicating that a row and column in the matrix specify a same cluster host, to a maximal value indicating a maximal network access cost; wherein the maximal network access cost is determined when a network access cost is greater than a defined latency threshold.

11. The system of claim 10, wherein the processor computes the data access costs automatically by using functionality running on each host; wherein the functionality at least one of:
performs input/output (I/O) from a respective cluster host to each of the other cluster hosts;
measures I/O latency of the performed I/O;
calculates statistical metrics of the I/O latency; and
runs on a new host that joins the computing cluster in addition to running on each of the existing cluster hosts to measure latency to the new host.

12. The system of claim 8, wherein the processor orders the cluster hosts in the list of cluster hosts by computing, for each cluster host, an expected cost for data access for the input workload, and ordering the cluster hosts in the list according to the order of the expected cost for data access for the input workload;
wherein computing for a first cluster host the expected cost for data access for the input workload running on the first cluster host comprises multiplying a total of expected costs of retrieving data from other cluster hosts different from the first cluster host with a probability of retrieving the data from the other cluster hosts.

13. The system of claim 12, wherein at least one of:
the probability of retrieving data from the other cluster hosts different than the first cluster host is computed as the proportion of the total data size of the set of files associated with the input workload which is not stored on the first host; and
the probability of retrieving data from the other cluster hosts different than the first cluster host is computed based on the data locality proportions input.

14. The system of claim 13, wherein at least one of:
the expected costs of retrieving data from other cluster hosts different than the first cluster host is computed by summarizing, over all cluster hosts different than the first cluster host, a cost of retrieving data used by the input workload from one of the other cluster hosts different than the first cluster host multiplied by the probability of retrieving the data from the other cluster hosts different than the first cluster host;
the cost of retrieving the data from the other cluster hosts different than the first cluster host by the input workload running on the first host is based on the data access costs information; and
the probability of retrieving data from a second host different than the first host by the input workload running on the first host is computed by dividing the respective proportion of the data stored on the second host with the total data proportions stored on all cluster hosts different than the first host.

15. A computer program product for workload management with data access awareness in a computing cluster, by a processor, the computer program product embodied on a non-transitory computer-readable storage medium having computer-readable program code portions stored therein, the computer-readable program code portions comprising:
an executable portion that configures a workload manager within the computing cluster to include a data requirements evaluator module and a scheduler module;
an executable portion that, in response to receiving an input workload for scheduling by the workload manager:

retrieves, by the data requirements evaluator module, a set of inputs from a storage system, wherein the inputs each include at least one of:
- data locality proportions for a set of files associated with the input workload, the data locality proportions respectively stored on each of a plurality of cluster hosts of the computing cluster, and
- data access costs specified for each pair of cluster hosts in the computing cluster; and an executable portion that generates, by the data requirements evaluator module, a list of the cluster hosts ranked for running the input workload according to data access considerations associated with the set of inputs.

16. The computer program product of claim 15, further including an executable portion that generates the data locality proportions for the set of files associated with the input workload by aggregating the respective proportion of data of each file stored on each of the cluster hosts to a level of the set of files associated with the input workload; and an executable portion that computes for each respective host of the cluster hosts a value ranging from a minimal value indicating that no data of the set of files is stored on the respective host, to a maximal value indicating that all the data of the set of files is stored on the respective host.

17. The computer program product of claim 15, further including an executable portion that represents the data access costs for each pair of cluster hosts in a matrix; wherein values in each cell in the matrix range from a minimal value indicating that a row and column in the matrix specify a same cluster host, to a maximal value indicating a maximal network access cost; wherein the maximal network access cost is determined when a network access cost is greater than a defined latency threshold.

18. The computer program product of claim 17, further including an executable portion that computes the data access costs automatically by using functionality running on each host; wherein the functionality at least one of:
- performs input/output (I/O) from a respective cluster host to each of the other cluster hosts;
- measures I/O latency of the performed I/O;
- calculates statistical metrics of the I/O latency; and
- runs on a new host that joins the computing cluster in addition to running on each of the existing cluster hosts to measure latency to the new host.

19. The computer program product of claim 15, further including an executable portion that orders the cluster hosts in the list of cluster hosts by computing, for each cluster host, an expected cost for data access for the input workload, and ordering the cluster hosts in the list according to the order of the expected cost for data access for the input workload;
wherein computing for a first cluster host the expected cost for data access for the input workload running on the first cluster host comprises multiplying a total of expected costs of retrieving data from other cluster hosts different from the first cluster host with a probability of retrieving the data from the other cluster hosts.

20. The computer program product of claim 19, wherein at least one of:
- the probability of retrieving data from the other cluster hosts different than the first cluster host is computed as the proportion of the total data size of the set of files associated with the input workload which is not stored on the first host; and
- the probability of retrieving data from the other cluster hosts different than the first cluster host is computed based on the data locality proportions input.

21. The computer program product of claim 20, wherein at least one of:
- the expected costs of retrieving data from other cluster hosts different than the first cluster host is computed by summarizing, over all cluster hosts different than the first cluster host, a cost of retrieving data used by the input workload from one of the other cluster hosts different than the first cluster host multiplied by the probability of retrieving the data from the other cluster hosts different than the first cluster host;
- the cost of retrieving the data from the other cluster hosts different than the first cluster host by the input workload running on the first host is based on the data access costs information; and
- the probability of retrieving data from a second host different than the first host by the input workload running on the first host is computed by dividing the respective proportion of the data stored on the second host with the total data proportions stored on all cluster hosts different than the first host.

* * * * *